Dec. 15, 1942.  L. A. MAJNERI  2,305,315

FLUID PRESSURE CONTROL DEVICE

Filed Aug. 1, 1941  2 Sheets-Sheet 1

INVENTOR.
LUDWIG A. MAJNERI
BY Whittemore, Hulbert & Belknap
ATTORNEYS

Dec. 15, 1942.    L. A. MAJNERI    2,305,315
FLUID PRESSURE CONTROL DEVICE
Filed Aug. 1, 1941    2 Sheets-Sheet 2

INVENTOR.
LUDWIG A. MAJNERI
BY Whittemore, Hulbert & Belknap
ATTORNEYS

Patented Dec. 15, 1942

2,305,315

UNITED STATES PATENT OFFICE 2,305,315

FLUID PRESSURE CONTROL DEVICE

Ludwig A. Majneri, Grosse Pointe, Mich., assignor to The Warner Aircraft Corporation, Detroit, Mich., a corporation of Michigan Application August 1, 1941, Serial No. 405,086

9 Claims. (Cl. 60—54.6)

The invention relates to fluid pressure control devices and refers more particularly to fluid pressure control devices for hydraulic brakes of airplanes.

The invention has for an object to provide an improved fluid pressure control device of the compound type.

The invention has for another object to so construct the device that the pistons are yieldably advanced during the low pressure stage and positively advanced during the high pressure stage.

The invention has for a further object to so construct the device that the reservoir is placed in communication with the larger diameter cylinder during the high pressure stage to reduce the applying force which would otherwise be required.

With these and other objects in view, the invention resides in the novel features of construction and combinations and arrangements of parts as more fully hereinafter set forth.

The fluid pressure control device is particularly applicable to a hydraulic brake system of an airplane, but it is apparent that the device may be used with other hydraulic brake systems. While the devices as shown do not incorporate the parking features of my Patent No. 2,115,174 issued April 26, 1938, and Patent No. 2,120,073 issued June 7, 1938, the parking features may be readily incorporated in accordance with the teachings of the patents.

Figure 1:
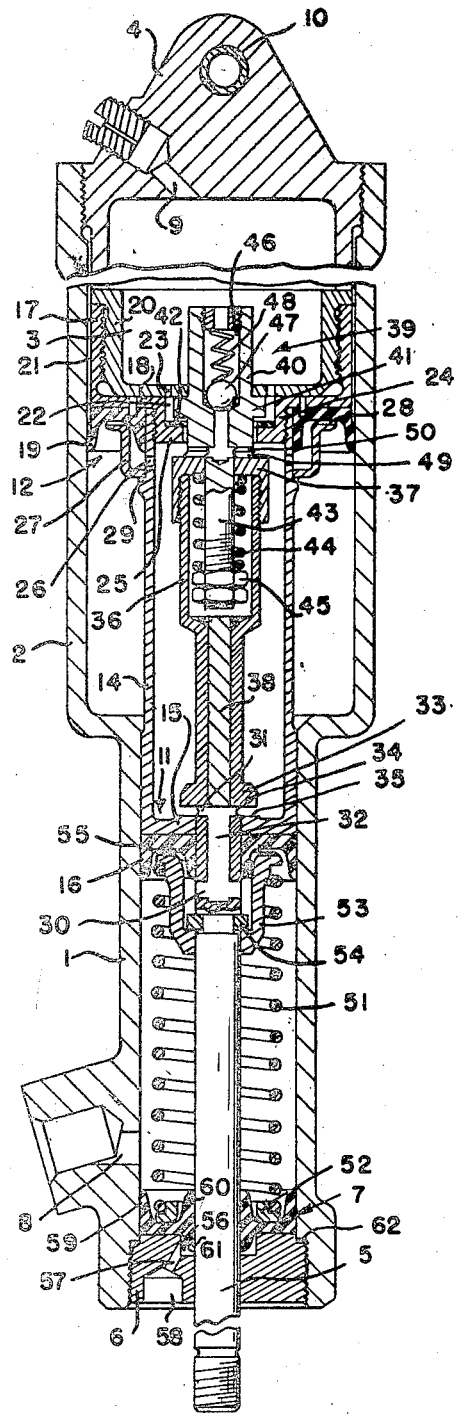
Figure 1 is a vertical central section through a fluid pressure control device embodying my invention.
Figures 2, 3:
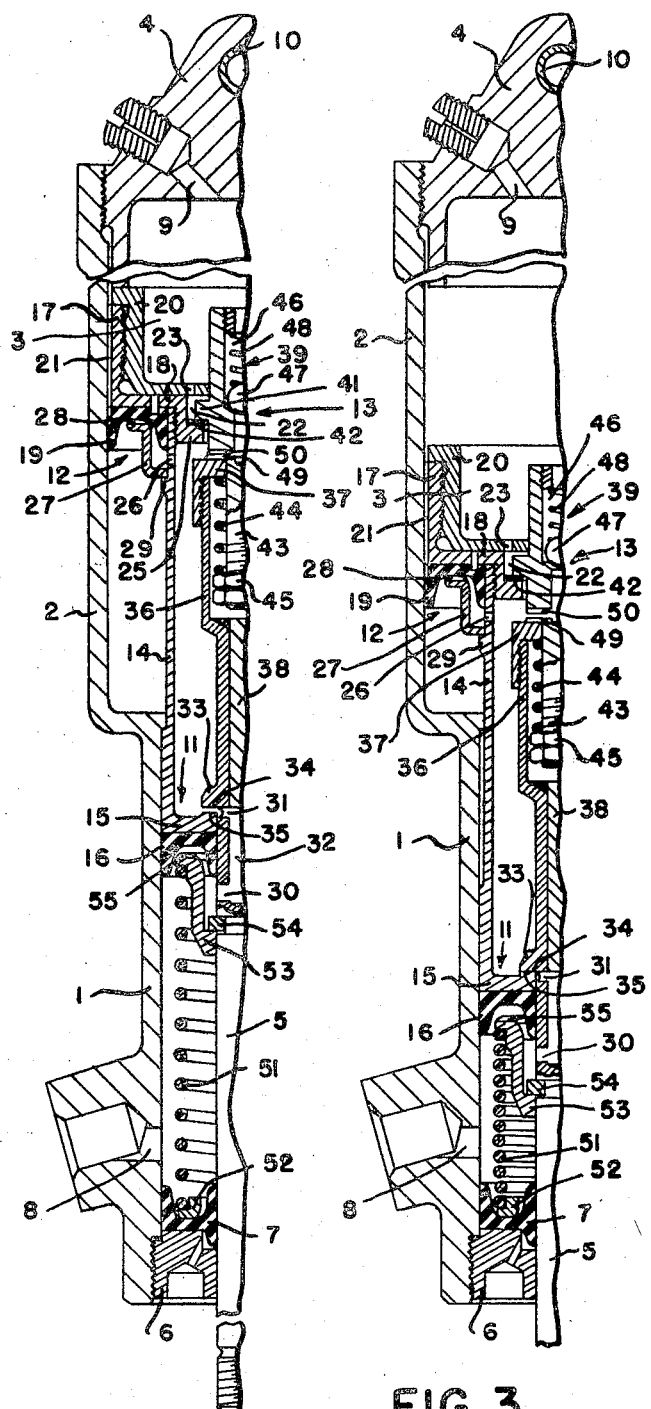
Figures 2 and 3 are similar views showing the parts in different position during the operation of the device.

Referring to Figures 1, 2 and 3, the fluid pressure control device occupies a substantially vertical position and comprises the axially aligned lower or forward cylinder 1, upper or rearward cylinder 2, braking fluid reservoir 3 above or beyond the upper cylinder 2, rear or upper end fitting 4, piston rod 5, and mechanism operated by the piston rod for producing fluid pressure. The lower cylinder 1 is closed at its lower end by the plug 6 and the sealing cup 7 through both of which the piston rod 5 axially extends. The lower cylinder is provided near its lower end with the discharge port 8 which is adapted to be connected to the wheel cylinders by the usual tubing (not shown). The upper cylinder 2 is of larger diameter and consequently of greater capacity than the lower cylinder 1. The upper end fitting 4 has a depending annular flange preferably threaded into the upper end of the upper cylinder 2. The fitting is provided with a suitable vent 9 placing the reservoir 3 in communication with the atmosphere and also preferably provided with a suitable bushing 10 for engaging a pivot pin of a suitable support.

The piston rod 5 is constructed to be pivotally connected to a suitable foot pedal for longitudinally moving the piston rod downwardly or forwardly to operate the control device.

The mechanism operated by the piston rod comprises the lower and upper pistons 11 and 12, respectively, and also valve mechanism 13. The lower piston 11 has a body formed of the sleeve 14 slidable within the lower cylinder 1 and the head 15 at the lower end of the sleeve and slidably engaging the piston rod 5 which extends axially therethrough. The lower piston also has the sealing cup 16 preferably formed of rubber abutting the lower side of the head and provided with concentric lips for slidably engaging the wall of the lower cylinder 1 and also the piston rod 5. The upper piston has a body formed of the sleeve 17 slidable within the upper cylinder 2 and the head 18 at the lower end of the sleeve. The upper piston also has the sealing cup 19 preferably formed of rubber and abutting the lower side of the head and provided with concentric lips, the outer of which slidably engages the wall of the upper cylinder 2 and the inner of which engages the upper end of the sleeve 14 of the lower piston. The upper piston also comprises the cup 20 having its side wall threadedly engaging the sleeve 17 and its bottom wall abutting the head 18. It will be noted that the cup 20 forms a part of the bottom of the reservoir 3. For the purpose of facilitating the flow of braking fluid, which is preferably liquid, from the reservoir into the upper cylinder 2 during the return of the upper piston to its normal or off position, the sleeve 17 is provided with the external longitudinally extending grooves 21.

The head 18 of the upper piston has the axial passageway 22 therethrough and the bottom of the cup 20 has the annular series of passageways 23 therethrough registering with the upper end of the passageway 22 near its periphery. The head 18 is formed with the depending concentric projection 24 having at its lower end the annular flange 25 extending toward its axis, the projection and annular flange both bounding the passageway 22. The projection 24 is externally threaded for engagement with internal threads on the upper end portion of the sleeve 14 of the lower piston 11, the connection being such that both the lower and upper pistons are positively connected to be moved in unison. Also by reason of the passageways 22 and 23 the reservoir is placed in communication with the interior of the sleeve. To place the annular space between the wall of the upper cylinder 2 and the sleeve 14 in communication with the interior of the sleeve, the latter is provided with the annular series of transverse holes 26 located slightly below the inner lip of the sealing cup 19 and the upper end of the cup-shaped retainer 27 is provided with the radial grooves 28. The retainer 27 encircles the sleeve 14 below the openings 26 and is supported upon the annular shoulder 29 on the sleeve 14 and the upper end of the retainer abuts the sealing cup 19 between its lips to hold the sealing cup against the head 18 of the upper piston body.

The piston rod 5 is formed with by-pass means for the lower piston 11 to place the lower and upper cylinders in communication and this means comprises a passageway formed of the lower and upper radial bores 30 and 31, respectively, and the axial bore 32 connecting the lower and upper bores. When the parts are in their normal or off position, the lower radial bores are below the inner lip of the sealing cup 16 and the upper radial bores are above the head 15 of the lower piston body. The piston rod also has the annular enlargement 33 above the radial bores 31 providing the annular lower face 34 engageable with the central raised face 35 of the head 15 to close the by-pass means for the lower piston and also to move the lower piston downwardly or forwardly, or to advance the same. It will be noted that the annular enlargement forms, in effect, a valve for controlling the lower piston by-pass means. The upper end portion of the piston rod 5 is formed with the hollow enlargement 36 to the upper end of which is threadedly secured the cap 37. The portion of the axial bore between the chamber formed in the enlargement 36 and the radial bores 31 is closed by the plug 38 preferably brazed in place. 39 is a valve having the body 40 extending through the axial passageway 22 in the head 18 of the upper piston body. The valve body is provided with the annular enlargement 41 which is located between the annular flange 25 of the head 18 and the bottom wall of the cup 20, there being clearance to provide for axial movement of the valve relative to the upper piston. The lower face of the annular enlargement 41 is adapted to seat upon the annular gasket 42 secured to the upper face of the annular flange 25. The valve also has the depending shank 43 which extends through the cap 38 and axially downwardly within the chamber formed within the enlargement 36 at the upper end of the piston rod. The valve is yieldably connected to the piston rod by means of the coil spring 44 encircling the shank 43 and abutting the cap 38 and the nut 45 threaded upon the lower end of the shank. The spring is calibrated to move the valve with the piston rod until a predetermined pressure of the braking fluid within the lower and upper cylinders 1 and 2 is created, this pressure being such that all clearance of the wheel brakes will be taken up before the spring yields. The valve body 40 is provided with the axial passageway 46 therethrough having its lower end portion reduced and adapted to be closed by the ball valve 47 within the enlarged upper portion of the passageway. The ball valve is normally held to its seat closing the passageway by means of the coil spring 48 which is calibrated preferably to yield after the coil spring 44 has yielded. The passageway 46 is in communication at all times with the interior of the sleeve 14 of the lower piston body and, consequently, with the upper cylinder 2 through the radial grooves 49 and 50, respectively, in the upper end of the cap 37 and the lower end of the valve body 40.

The parts are held in the normal or off positions by the coil spring 51 within the lower cylinder 1 and encircling the piston rod 5, the lower end of the coil spring abutting the ring 52, which in turn abuts the sealing cup 7. The upper end of the coil spring abuts the cup-shaped retainer 53 which is sleeved on the piston rod 5 and is held in engagement with the C-washer 54 engaging an annular groove in the piston rod. The upper end of the retainer clears the sealing cup 16 between its lips and is provided with milled radial grooves 55 to assure communication between the lower cylinder and the upper cylinder through the by-pass means for the lower piston.

To prevent entrance of air into the lower cylinder 1 during the return stroke of the lower piston and other parts to their normal or off positions, the plug 6 is formed with the concentric annular recess 56 at its upper end and inner edge and with the diagonal air passageways 57 leading from the outer wall of the recess to the tool receiving sockets 58. The sealing cup 7 is preferably formed of rubber and has the concentric inner and outer upwardly extending lips 59 and 60, respectively, engaging the wall of the lower cylinder 1 and the piston rod 5. The sealing cup also has the concentric inner downwardly extending lip 61 located within the recess 56 and clearing its walls and engaging the piston rod 5. In the event that a vacuum is created in the lower cylinder 1, air can enter the recess 56 to force the sealing lip 61 more firmly against the piston rod 5 to thereby secure a more effective seal. The plug 6 has an externally threaded portion of greater diameter than the internal diameter of the lower cylinder 1 for threadedly engaging the lower end of the lower cylinder, and to prevent the leakage of air past the threads into the lower cylinder there is the gasket 62 which is clamped between opposed shoulders on the plug and lower cylinder.

Referring to Figure 1 which shows the parts in their normal or off positions, it will be noted that the lower cylinder 1 communicates with the upper cylinder 2 through the space above the retainer 53 and the radial grooves 55 in the retainer, the lower radial bores 30, the axial bore 32, the upper radial bores 31, the interior of the sleeve 14, the transverse holes 26 in the sleeve, and the radial grooves 28 in the retainer 27. The reservoir 3 communicates with the interior of the sleeve 14 and, consequently, with the lower and upper cylinders 1 and 2 through the passageway 22, the annular enlargement 41 of the valve body 40 abutting the bottom wall of the cup 20, and the upper end of the side wall of the cup 20 abutting the depending annular flange of the upper end fitting 4. Also, the ball valve 47 is held to its seat closing the passageway 46 in the valve body 40. It will be noted that the coil springs 51 and 44 hold the parts, with the exception of the ball valve 47, in their normal or off positions and that the coil spring 48 and gravity hold the ball valve in its normal or off position closing the passageway 46.

When force is exerted pulling downwardly on the piston rod 5 to advance the pistons, the valve 39 is moved downwardly by means of the piston rod, the coil spring 44, the nut 45, and the shank 43 of the valve body to engage the lower face of the annular enlargement 41 of the valve body with the gasket 42 to close communication between the reservoir 3 and the interior of the sleeve 14 through the passageway 22. The clearance between the lower face of the annular enlargement and the gasket is less than the clearance between the lower face 34 of the piston rod enlargement 33 and the upper face 35 of the head 15 of the lower piston body so that after the enlargement has come into contact with the gasket the by-pass means for the lower piston 11 is still open. During this initial downward movement of the piston rod, the coil spring 51 is slightly compressed. Figure 2 shows the positions of the parts at this time.

During the continued downward movement of the piston rod, the valve 40 moves the upper piston 12 downwardly, which in turn moves the lower piston 11 downwardly, the coil spring 51 being compressed independently of the pistons by reason of the retainer 53 and the C-washer 54. During this downward movement, braking fluid flows from the upper cylinder to the lower cylinder through the by-pass means for the lower piston until the pressure of the braking fluid overcomes the coil spring 44. This pressure, as previously stated, is such that all clearance is taken up in the wheel brakes. Then upon compression of the coil spring 44 the lower face 34 of the annular enlargement 33 of the piston rod is seated against the upper face 35 of the head of the lower piston to close the by-pass means for the lower piston, after which and upon continued downward movement of the piston rod 5 the lower piston is moved directly by the piston rod and functions to force the braking fluid to the wheel cylinders. The pressure created by the upper piston 12 is relieved after the by-pass means for the lower piston is closed and during the continued downward movement of the piston rod by the braking fluid in the upper cylinder raising the ball valve 47 against the pressure exerted by the coil spring 48. At this time the parts are in the position shown in Figure 3.

Upon release of the pulling pressure upon the piston rod 5, the retracting coil spring 51 resiliently moves the piston rod, valve 39 and lower and upper pistons 11 and 12, respectively, back to their normal or off positions, during which time the coil springs 44 and 48 assume their normal positions. During the return stroke, it will be noted that braking fluid may pass from the reservoir 3 between the sleeve of the upper piston body and the wall of the upper cylinder and also between the outer lip of the sealing cup of the upper piston and the wall of the upper cylinder into the upper cylinder. Braking fluid also may pass from the reservoir 3 through the axial passageway 22 into the interior of the sleeve 14 and through the by-pass means for the lower piston to the lower cylinder, or flow in the opposite direction.

Figure 4:
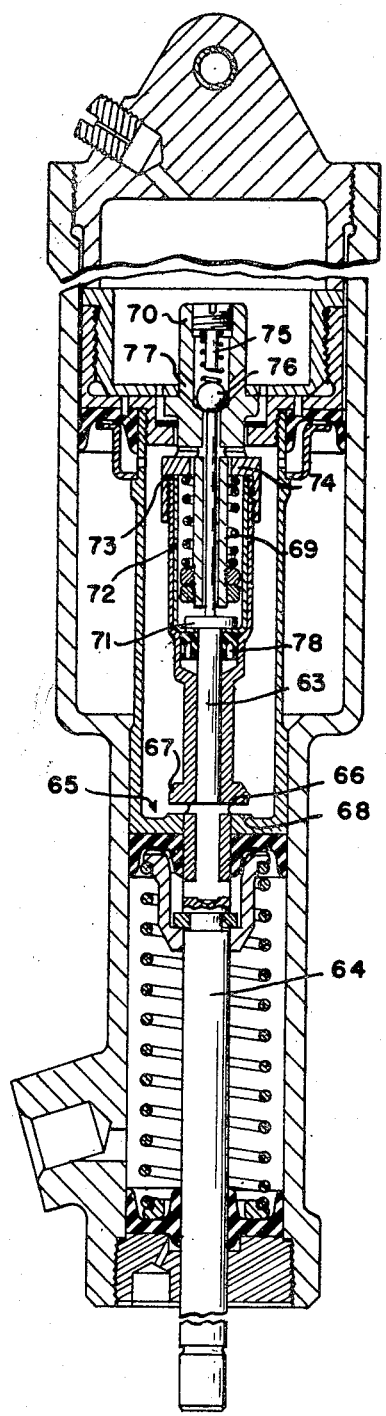
Figures 4 and 5 are views similar to Figure 1 showing other embodiments of my invention.

In the modification illustrated in Figure 4, the fluid pressure control device has the same general arrangement of parts as that illustrated in Figures 1, 2 and 3, but differs in providing the axially movable plunger 63 in the portion of the piston rod 64 above the lower piston 65 and preferably having its lower end flush with the lower face 66 of the annular enlargement 67 upon the piston rod. The lower face is engageable with the central raised face 68 of the head of the lower piston body to close the by-pass means for the lower piston and also to positively advance the pistons by means of the piston rod. The plunger 63 extends axially through the shank 69 of the valve 70 and is provided with the head 71 which is located between the lower end of the shank 69 and the base of the retainer 72. The retainer extends within the chamber formed in the enlargement at the upper end of the piston rod and has an anular flange 73 at its upper end which is clamped between the cap 74 and the enlargement. The body of the valve 70 also differs from that of the previously described modification in that it has fixedly secured in its upper end the axial plug 75 which forms a stop for the ball valve 76. Furthermore, the body is provided with the diagonal passageways 77 which open into the axial passageway in the body at the lower end of its enlarged portion. The sealing cup 78 is provided within the chamber formed within the enlarged upper end portion of the piston rod below the retainer 72 to prevent braking fluid from being forced from the lower cylinder into the upper cylinder through the portion of the piston rod slidably engaged by the plunger 63.

With this construction, after the piston rod has been lowered to an extent such that the lower face 66 of the annular enlargement 67 of the piston rod has engaged the upper face 68 of the body of the lower piston, the pressure created in the lower cylinder acts on the plunger 63 to raise the same which, in turn, raises the ball valve 76 from its seat so that the upper cylinder is placed in communication with the reservoir through the passageways, including the diagonal passageways 77. As a result, no appreciable effort is wasted in the displacement of the braking fluid by the upper piston.

Figure 5:
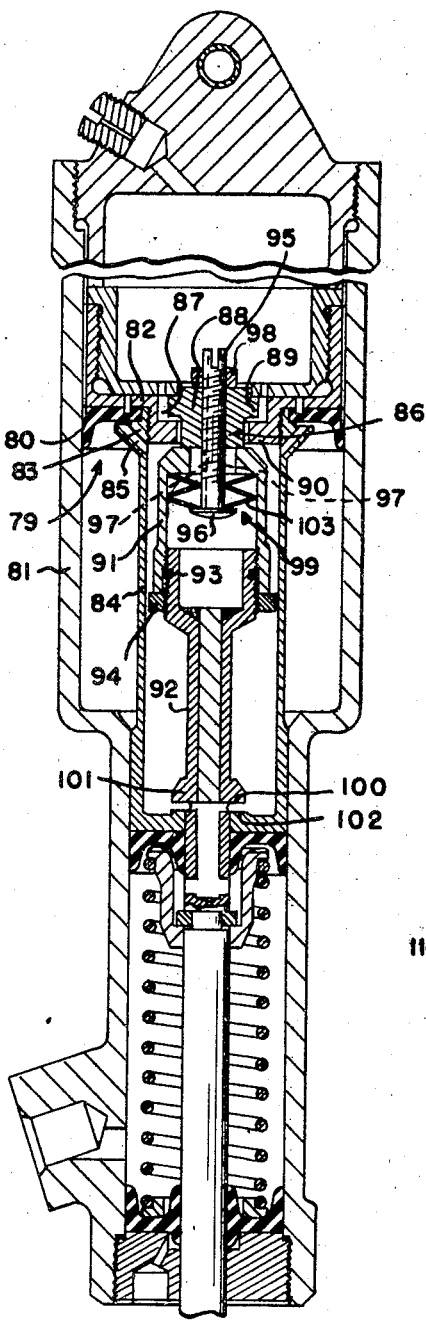

It will be noted that the modification illustrated in Figure 5 differs from that of Figures 1, 2 and 3 in that the upper piston, the valve mechanism at the upper end of the piston rod, and also the upper end portion of the piston rod, have been changed. The upper piston 79 has been changed essentially by providing the rubber sealing cup 80 with only an outer lip which is engageable with the wall of the upper cylinder 81. The base of the sealing cup is clamped between the head 82 of the upper piston body and the enlargement 83 at the upper end of the sleeve 84 forming part of the body of the lower piston. Communication between the upper cylinder and the interior of the sleeve is provided by the diagonal passageways 85 in the enlargement 83.

The valve 86 for closing the axial passageway 87 in the upper piston body has its body 88 formed with the annular enlargement 89 for seating directly upon the annular flange 90 of the upper piston body. The lower end of the valve body 88 also seats directly on the upper end of the cap 91. In both instances lapped seats are formed to provide effective seals. The cap 91 forms a part of the piston rod assembly and is threaded upon the enlarged upper end of the piston rod 92 and forms therewith a chamber. A sealing ring 93 between the cap and the enlarged upper end of the piston rod prevents the flow of braking liquid past the threads and a lock nut 94 threaded on the enlarged upper end of the piston rod abuts the lower end of the cap to lock the latter in place.

The valve body 88 is internally threaded for engagement with the axially extending hollow bolt 95 which extends axially downwardly through the cap 91 and has the head 96 within the chamber formed by the cap and piston rod. The bolt is preferably formed with the radial ports 97 below the valve body. 98 is a lock nut on the bolt abutting the upper end of the valve body.

99 are rimless frusto-conical snap springs arranged in series between the bolt head 96 and the cap 91 for resiliently holding the valve 86 seated on the cap 91. The snap springs are so constructed that they provide for snap or sudden movement of the piston rod 92 relative to the valve 86 a distance equal to the clearance between the lower face 100 of the annular enlargement 101 of the piston rod and the central upper raised face 102 of the lower piston body when the predetermined pressure of braking fluid in the cylinders has been reached. In the normal or off positions of the parts, the snap springs hold the valve 86 in contact with the cap 91 but when the predetermined pressure has been created in the cylinders snap movement of the piston rod relative to the valve takes place to instantly seat the enlargement 101 of the piston rod upon the lower piston body to close the by-pass means for the lower piston. At the same time the relief passageway, including the radial ports 97 and the axial passageway through the hollow bolt, is opened providing communication between the upper cylinder and the reservoir. With this arrangement, either the by-pass means for the lower piston or the relief passageway for the upper cylinder can be open depending upon the fluid pressure, but neither can be partly open at the same time.

The snap springs 99 are preferably provided with the holes 103 which permit free passage of the braking fluid through the snap springs so that the braking fluid may lubricate the snap springs and their contacts with the cap and hollow bolt. The holes may be of such size that, if desired, the radial ports 97 may be eliminated.

With this arrangement, the snap springs are preloaded to any desired value by adjusting the hollow bolt 95 relative to the valve 86, the upper end of the bolt being slotted for this purpose. The bolt may then be locked in adjusted position by the lock nut 98. The amount of travel during the snap action of the snap springs is controlled by turning the cap 91 relative to the piston rod 92 and then locking by means of the nut 94. This latter adjustment controls the width of the passage between the faces 100 and 102 of the piston rod and lower piston body, respectively, after the valve body 88 has seated on the annular flange 90 of the upper piston body, the width of the passage corresponding to the amount the snap springs can snap.

Figure 6:
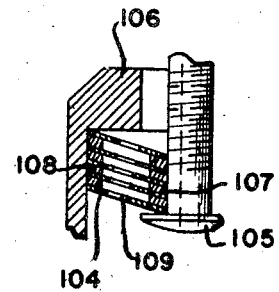
Figures 6, 7, 8 and 9 are views similar to a portion of Figure 5 showing other modifications.

In the modification illustrated in Figure 6, the frusto-conical snap springs 104 are arranged in parallel between the bolt head 105 and the top of the cap 106 with the annular spacers 107 and 108 between the snap springs, respectively at their inner and outer edges. The snap springs are preferably formed with the holes 109 therethrough for the purpose of reducing friction when the springs are in operation. These holes will also permit eliminating the transverse ports in the bolt.

Figure 7:
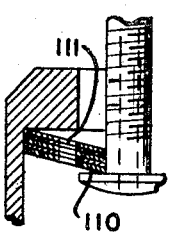

Figure 7 shows another modification in which the frusto-conical snap springs 110 are arranged in parallel and touching each other. These snap springs are also preferably provided with the holes 111 therethrough which permit the braking fluid to enter between the snap spring due to capillary action and provide sufficient lubrication so that the friction between the springs will not be objectionable. If desired, the radial ports in the hollow bolt may be eliminated, in which case the braking fluid after passing between the valve body and the top of the cap passes downwardly through the holes 111 to the axial passageway in the bolt.

Figure 8:
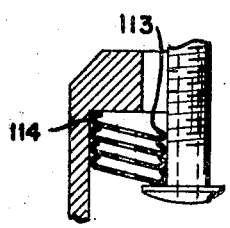

In the modification illustrated in Figure 8, the frusto-conical snap springs 112 are arranged in parallel and they are provided with rolled inner and outer rims 113 and 114, respectively. The rolled rims serve to control the deflectional characteristics of the snap springs and to space the same to thereby avoid the necessity of spacers, such as shown in Figure 6.

Figure 9:
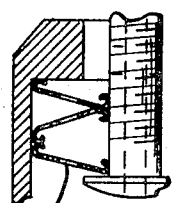

Figure 9 discloses another modification in which the frusto-conical snap springs 115 are arranged in series and formed with rolled inner and outer rims.

It will be noted that the snap springs of both Figures 8 and 9 are preferably formed with holes therethrough so that both modifications may operate in the same manner as those previously described.

What I claim as my invention is:

1. A fluid pressure control device comprising a cylinder having a discharge port, a second cylinder of larger diameter than said first mentioned cylinder, a piston slidable within said first mentioned cylinder, a second piston slidable within said second cylinder and positively connected to said first mentioned piston, a fluid reservoir, said second piston having a passageway therethrough for placing said second cylinder and reservoir in communication, a valve movable axially relative to said second piston for closing said passageway and moving said second piston, said valve having a passageway therethrough for placing said second cylinder in communication with said reservoir, means carried by said valve for normally closing said second mentioned passageway, a piston rod movable axially relative to said first mentioned piston and having a passageway for placing said cylinders in communication, and a yieldable connection between said valve and piston rod for moving the former through the latter, said connection being yieldable when a predetermined pressure within said first mentioned cylinder has been created whereby said piston rod moves relative to said first mentioned piston to close the passageway in said piston rod and said means carried by said valve opens to place said second cylinder in communication with said reservoir.

2. A fluid pressure control device comprising a pair of cylinders of different diameter, the smaller diameter cylinder having a discharge port, pistons slidable in unison in said cylinders, means for placing said cylinders in communication, a fluid reservoir, means for placing the larger diameter cylinder in communication with said reservoir, means for moving said pistons forward comprising a valve for closing said last mentioned communication means, a rod, and a connection between said valve and rod yieldable when a predetermined pressure within one of said cylinders is created, means on said rod for closing said first mentioned communication means upon yielding of said connection, and other means for placing the larger diameter cylinder in communication with said reservoir when a predetermined pressure within one of said cylinders is created to relieve the fluid pressure in the larger diameter cylinder.

3. A fluid pressure control device comprising axially aligned lower and upper cylinders, said upper cylinder being of larger diameter than said lower cylinder, a fluid reservoir above said upper cylinder, lower and upper pistons within said cylinders movable in unison, by-pass means for said lower piston to place said lower and upper cylinders in communication, said upper piston having a passageway therethrough for placing said upper cylinder in communication with said reservoir, a valve movable forwardly to close said passageway and then move said upper piston forwardly, a piston rod, a yieldable connection between said valve and piston rod for moving the former forwardly through the latter, said connection being yieldable when a predetermined pressure within said lower cylinder is created, means on said piston rod for closing said by-pass means upon yielding of said connection, and means for placing said upper cylinder in communication with said reservoir upon yielding of said connection.

4. A fluid pressure control device comprising a cylinder having a discharge port, a second cylinder of larger diameter than said first mentioned cylinder, a piston slidable within said first mentioned cylinder, a second piston slidable within said second cylinder and positively connected to said first mentioned piston, a fluid reservoir, said second piston having a passageway therethrough for placing said second cylinder and reservoir in communication, a valve movable axially relative to said second piston for closing said passageway and then moving said second piston, said valve having a passageway therethrough for placing said second cylinder in communication with said reservoir, a second valve for normally closing said second mentioned passageway, a piston rod movable axially relative to said first mentioned piston and having a passageway for placing said cylinders in communication, a yieldable connection between said first mentioned valve and piston rod for moving the former through the latter, said connection being yieldable when a predetermined pressure within said first mentioned cylinder has been created whereby said piston rod moves relative to said first mentioned piston to close the passageway in said piston rod, and yieldable means for holding said second valve closed, said last mentioned means being yieldable when a predetermined pressure has been created in said second cylinder whereby said second valve moves to open position.

5. A fluid pressure control device comprising a pair of cylinders of different diameter, the smaller diameter cylinder having a discharge port, pistons slidable in unison in said cylinders, means for placing said cylinders in communication, a fluid reservoir, means for placing the larger diameter cylinder in communication with said reservoir, means for moving said pistons forward comprising a member for closing said last mentioned communication means, a second member for closing said first mentioned communication means and a yieldable member connecting said first mentioned member and said second member, said member being yieldable when a predetermined pressure within one of said cylinders is created, and other means for placing the larger diameter cylinder in communication with said reservoir when a predetermined pressure within one of said cylinders is created.

6. A fluid pressure control device comprising axially aligned lower and upper cylinders, said upper cylinder being of larger diameter than said lower cylinder, a fluid reservoir above said upper cylinder, lower and upper pistons within said cylinders movable in unison, by-pass means for said lower cylinder to place said lower and upper cylinders in communication, said upper piston having a passageway therethrough for placing said upper cylinder in communication with said reservoir, a piston rod provided with means for closing said by-pass means and moving said lower piston, a valve for closing said passageway through said upper piston and moving said upper piston forwardly, said valve having a longitudinal passageway therethrough opening into said reservoir and also having a portion engageable with said piston rod to close said last mentioned passageway, and a yieldable connection between said piston rod and valve for moving the latter forwardly, said connection being yieldable when a predetermined pressure within said lower cylinder is created to provide for movement of said piston rod relative to said valve.

7. A fluid pressure control device comprising a cylinder having a discharge port, a second cylinder of larger diameter than said first mentioned cylinder, a piston slidable within said first mentioned cylinder, a second piston slidable within said second cylinder and positively connected to said first mentioned piston, a fluid reservoir, said second piston having a passageway therethrough for placing said second cylinder and reservoir in communication, a valve movable axially relative to said second piston for closing said passageway and then moving said second piston, said valve having a passageway therethrough for placing said second cylinder in communication with said reservoir, a second valve for normally closing said second mentioned passageway, a piston rod movable axially relative to said first mentioned piston and having a passageway for placing said cylinders in communication and a portion engageable with said first mentioned piston to close said last mentioned passageway and positively move said first mentioned piston, a yieldable connection between said first mentioned valve and piston rod for moving the former through the latter, said connection being yieldable when a predetermined pressure within said first mentioned cylinder has been created whereby said piston rod moves relative to said first mentioned piston, and a plunger within said piston rod engageable with said second mentioned valve to move the same to open position, said plunger being movable after said connection has yielded under the fluid pressure created in said first mentioned cylinder.

8. A fluid pressure control device comprising a pair of cylinders of different diameter, the smaller diameter cylinder having a discharge port, pistons slidable in unison in said cylinders, means for placing said cylinders in communication, a fluid reservoir, means for placing the larger diameter cylinder in communication with said reservoir, means for moving said pistons forward comprising a piston rod provided with means for closing said first mentioned communication means, a valve for closing said last mentioned communication means, said valve normally seating on said piston rod, a bolt extending through said valve and having a longitudinally extending passageway therethrough for placing said reservoir in communication with the larger diameter cylinder when said valve is unseated from said piston rod, and spring means between said piston rod and bolt for resiliently holding said valve seated on said piston rod.

9. In a fluid pressure control device, a pair of cylinders of different diameter, pistons slidable in unison in said cylinders, a fluid reservoir, the larger diameter piston having a passageway therethrough in communication with said reservoir, and means for advancing said pistons comprising a piston rod, a valve for closing said passageway, a hollow bolt having a longitudinal passageway communicating with said reservoir, said bolt being mounted on said valve, and frusto-conical snap spring means operatively connected to said piston rod and bolt for resiliently holding said valve seated on said piston rod to close communication between one of said cylinders and the interior of said bolt.

LUDWIG A. MAJNERI.